(12) United States Patent
Mota

(10) Patent No.: US 12,414,539 B1
(45) Date of Patent: Sep. 16, 2025

(54) REMOTE PET TREAT-DISPENSING SYSTEM FOR USE WITH A MAILBOX

(71) Applicant: Daniel R. Mota, New Bedford, MA (US)

(72) Inventor: Daniel R. Mota, New Bedford, MA (US)

( * ) Notice: Subject to any disclaimer, the term of this patent is extended or adjusted under 35 U.S.C. 154(b) by 0 days.

(21) Appl. No.: 18/616,476

(22) Filed: Mar. 26, 2024

(51) Int. Cl.
*A01K 5/01* (2006.01)

(52) U.S. Cl.
CPC .................................. *A01K 5/0114* (2013.01)

(58) Field of Classification Search
CPC ...................................................... A01K 5/0114
See application file for complete search history.

(56) References Cited

U.S. PATENT DOCUMENTS

| | | | |
|---|---|---|---|
| D353,579 S | 12/1994 | Rao | |
| 8,588,967 B2 | 11/2013 | Carelli | |
| D947,924 S | 4/2022 | Zheng | |
| 11,455,871 B2 | 9/2022 | Bender | |
| 11,583,604 B1 * | 2/2023 | Gressick | ................... A61L 9/02 |
| 11,602,125 B2 | 3/2023 | Tompkins | |
| 2006/0081644 A1 | 4/2006 | Arnold | |
| 2013/0319338 A1 * | 12/2013 | Davis | ................... A01K 5/0114 |
| | | | 119/57.1 |
| 2015/0327514 A1 | 11/2015 | Clark | |
| 2015/0342150 A1 * | 12/2015 | Womble | ................. A01K 15/02 |
| | | | 119/718 |
| 2021/0153456 A1 * | 5/2021 | Mundell | ............. A01K 15/021 |
| 2022/0240704 A1 | 8/2022 | Castagno | |
| 2023/0240533 A1 * | 8/2023 | Snyder | ................. G05B 13/027 |
| | | | 702/127 |

FOREIGN PATENT DOCUMENTS

WO 2021188272 9/2021

* cited by examiner

*Primary Examiner* — Christopher D Hutchens
(74) *Attorney, Agent, or Firm* — Kyle A. Fletcher, Esq.

(57) ABSTRACT

The remote pet treat-dispensing system for use with a mailbox may include a treat dispensing unit and a remote activation unit. The remote pet treat-dispensing system may be adapted to train a dog to behave less aggressively when a mail carrier delivers mail. Responsive to an indication from the remote activation unit that the mail carrier has accessed a mail receptacle, the treat dispensing unit may be adapted to play an audible sound intended to attract the dog to the treat dispensing unit, may activate an air moving device to diffuse the scent of a plurality of dog treats stored within the treat dispensing unit, and may dispense one or more individual dog treats. As non-limiting examples, the mail receptacle may be a mailbox located outside of a building or a mail slot located on a front door.

18 Claims, 6 Drawing Sheets

US 12,414,539 B1

REMOTE PET TREAT-DISPENSING SYSTEM FOR USE WITH A MAILBOX

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of annunciators and pet training systems, more specifically, a remote pet treat-dispensing system for use with a mailbox.

SUMMARY OF INVENTION

The remote pet treat-dispensing system for use with a mailbox may comprise a treat dispensing unit and a remote activation unit. The remote pet treat-dispensing system may be adapted to train a dog to behave less aggressively when a mail carrier delivers mail. Responsive to an indication from the remote activation unit that the mail carrier has accessed a mail receptacle, the treat dispensing unit may be adapted to play an audible sound intended to attract the dog to the treat dispensing unit, may activate an air moving device to diffuse the scent of a plurality of dog treats 930 stored within the treat dispensing unit, and may dispense one or more individual dog treats. As non-limiting examples, the mail receptacle may be a mailbox located outside of a building or a mail slot located on a front door.

An object of the invention is to dispense one or more individual dog treats into a tray from a hopper holding a plurality of dog treats in response to a wireless indication from a remote activation unit that a mail receptacle door has been moved.

Another object of the invention is to provide a sound transducer operable to play a sound that may attract the dog to a treat dispensing unit.

A further object of the invention is to provide an air-moving device and a rotation motor to blow the scent of the plurality of treats into an area in front of the treat dispensing unit.

Yet another object of the invention is to provide a camera to record the behavior of the dog and to make the recording available wirelessly to the user's smart phone.

These together with additional objects, features and advantages of the remote pet treat-dispensing system for use with a mailbox will be readily apparent to those of ordinary skill in the art upon reading the following detailed description of the presently preferred, but nonetheless illustrative, embodiments when taken in conjunction with the accompanying drawings.

In this respect, before explaining the current embodiments of the remote pet treat-dispensing system for use with a mailbox in detail, it is to be understood that the remote pet treat-dispensing system for use with a mailbox is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the remote pet treat-dispensing system for use with a mailbox.

It is therefore important that the claims be regarded as including such equivalent construction insofar as they do not depart from the spirit and scope of the remote pet treat-dispensing system for use with a mailbox. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
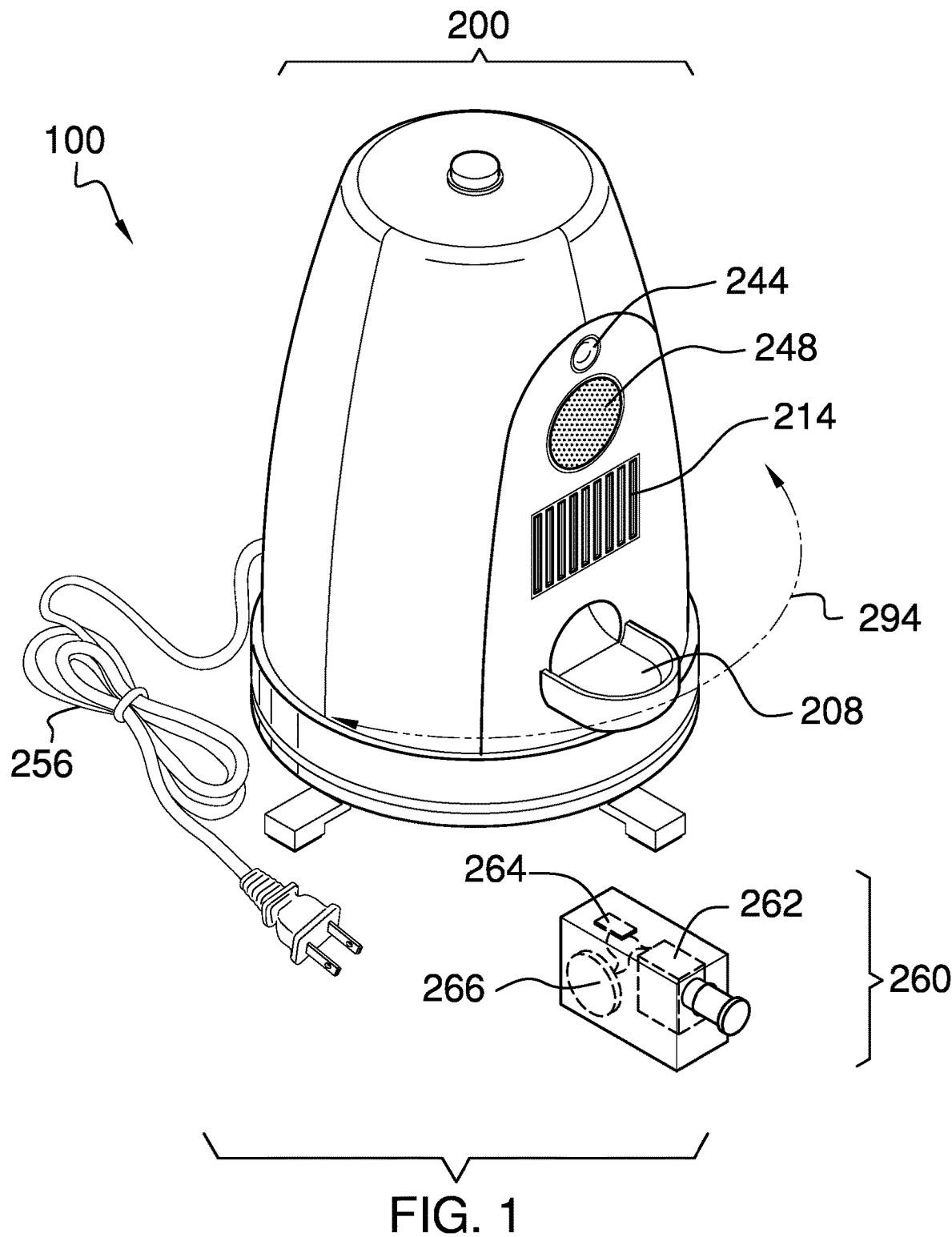
FIG. 1 is an isometric kit view of an embodiment of the disclosure.
Figure 2:
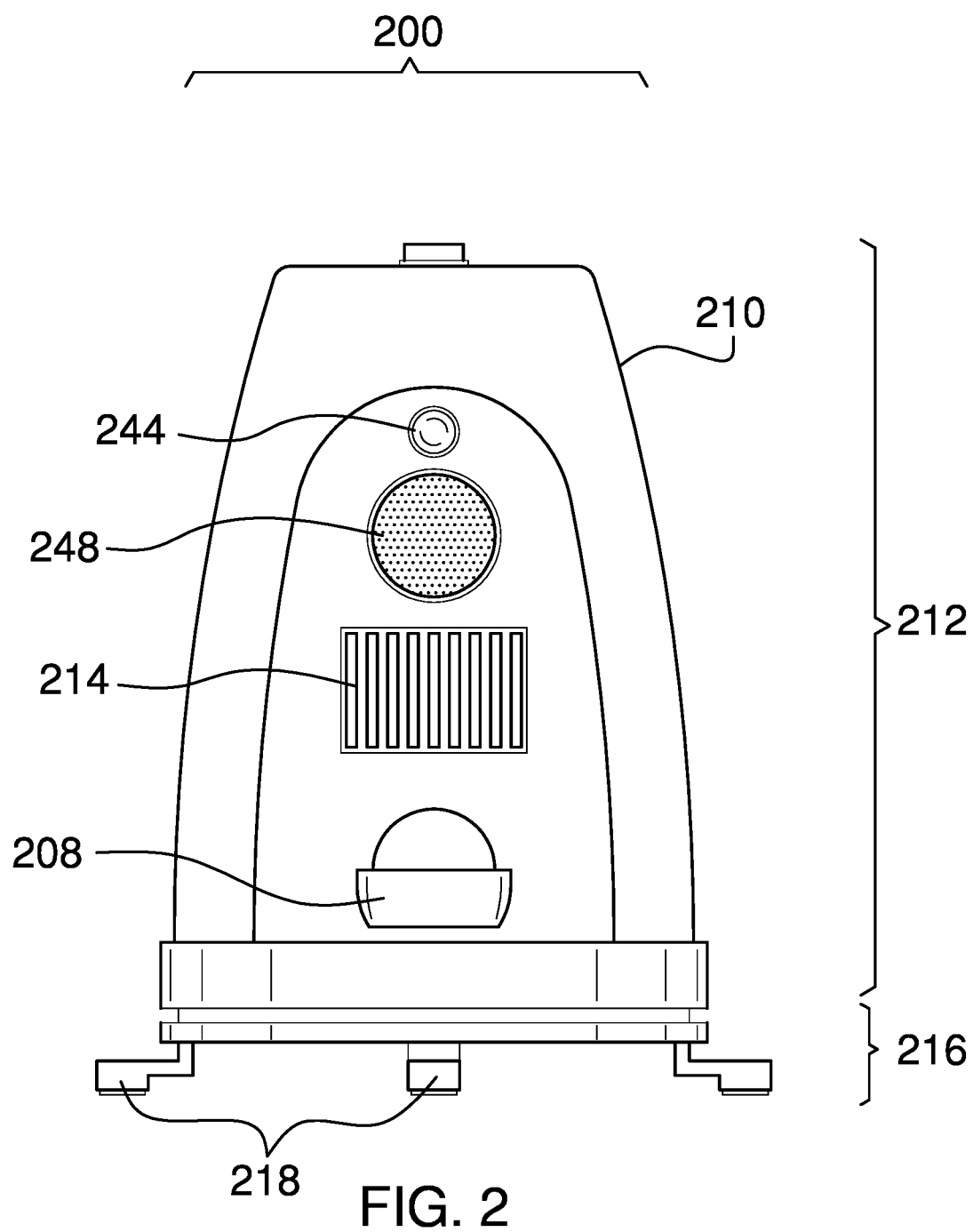
FIG. 2 is a front view of an embodiment of the disclosure.
Figure 3:
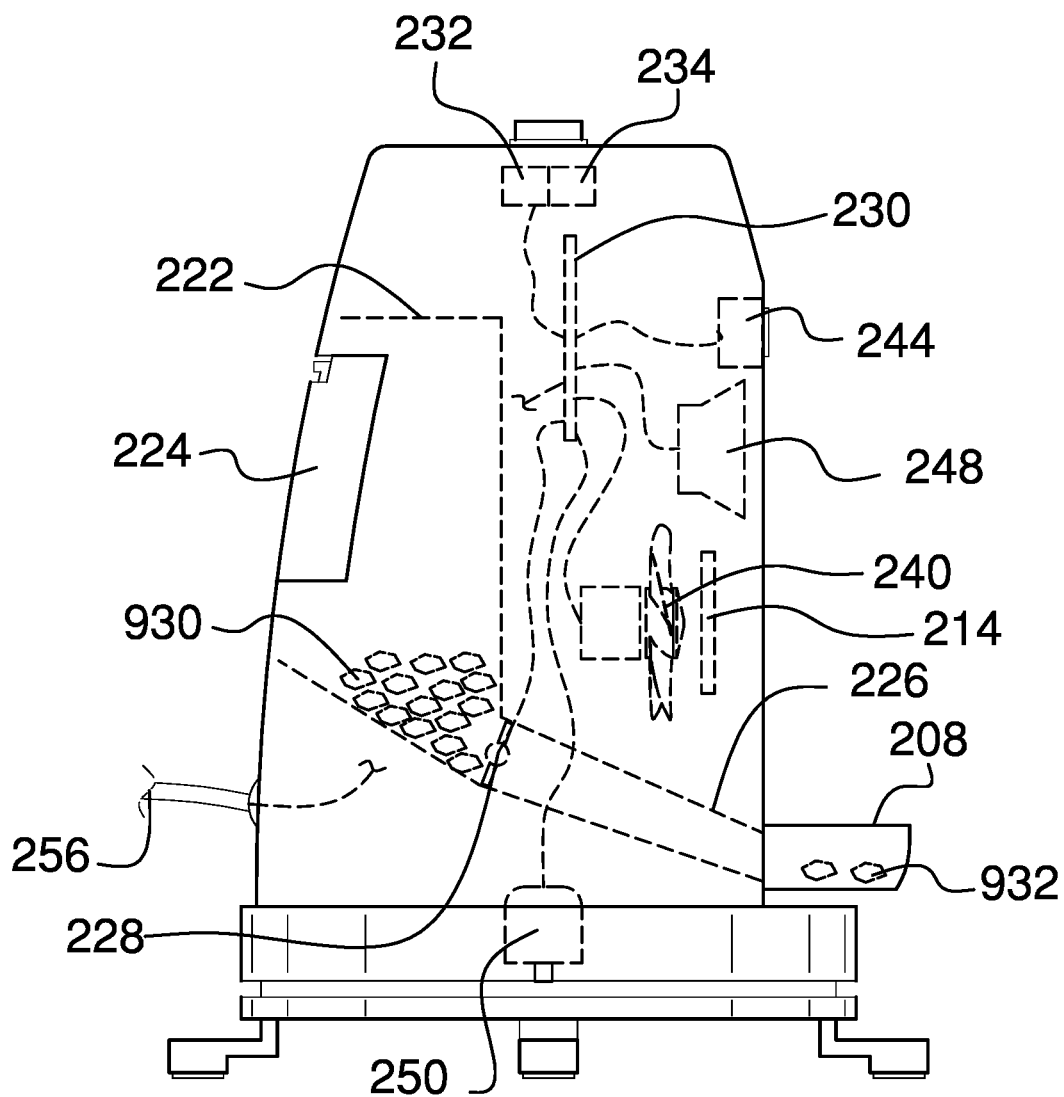
FIG. 3 is a side detail view of an embodiment of the disclosure.
Figure 4:
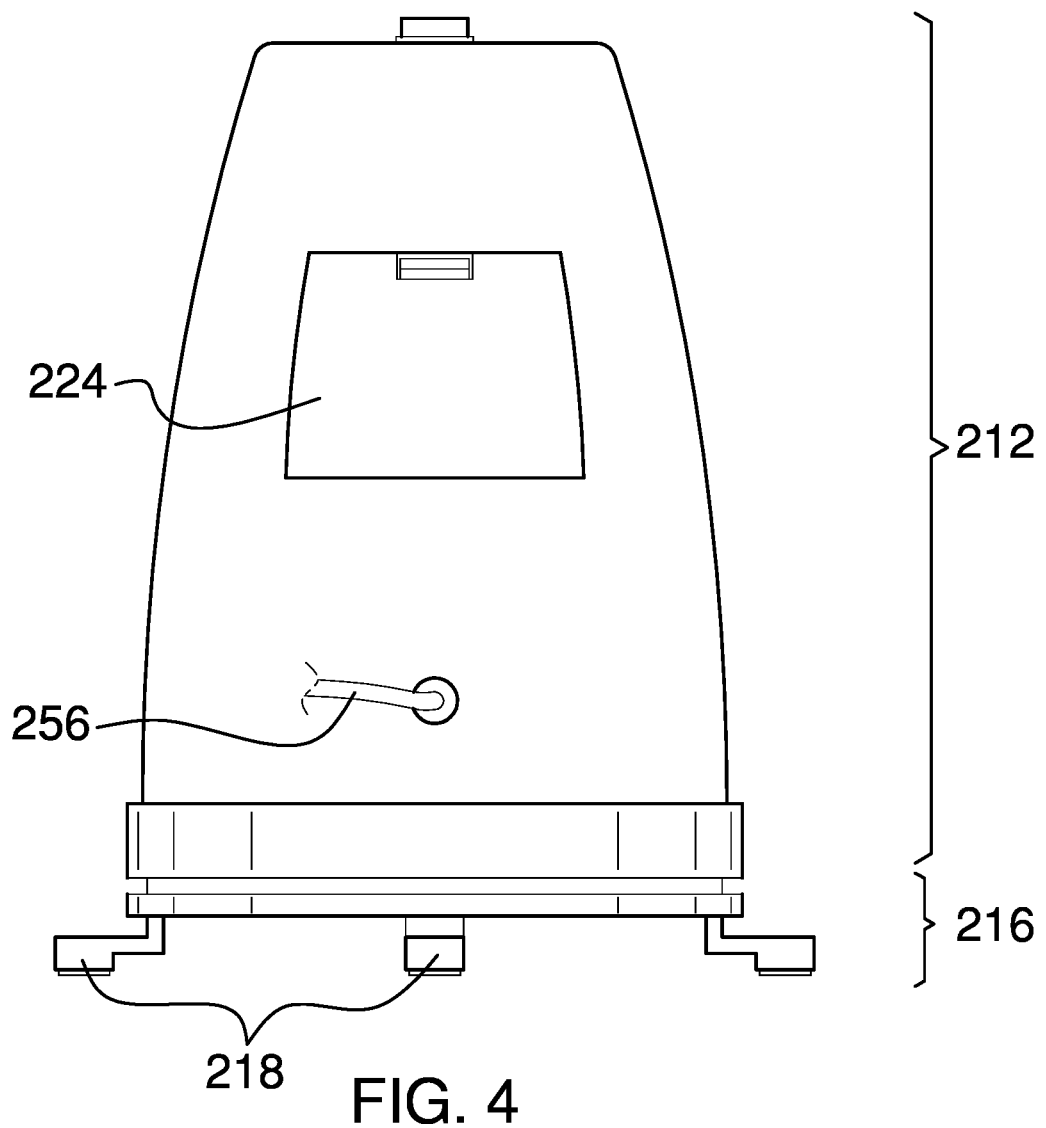
FIG. 4 is a rear view of an embodiment of the disclosure.
Figure 5:
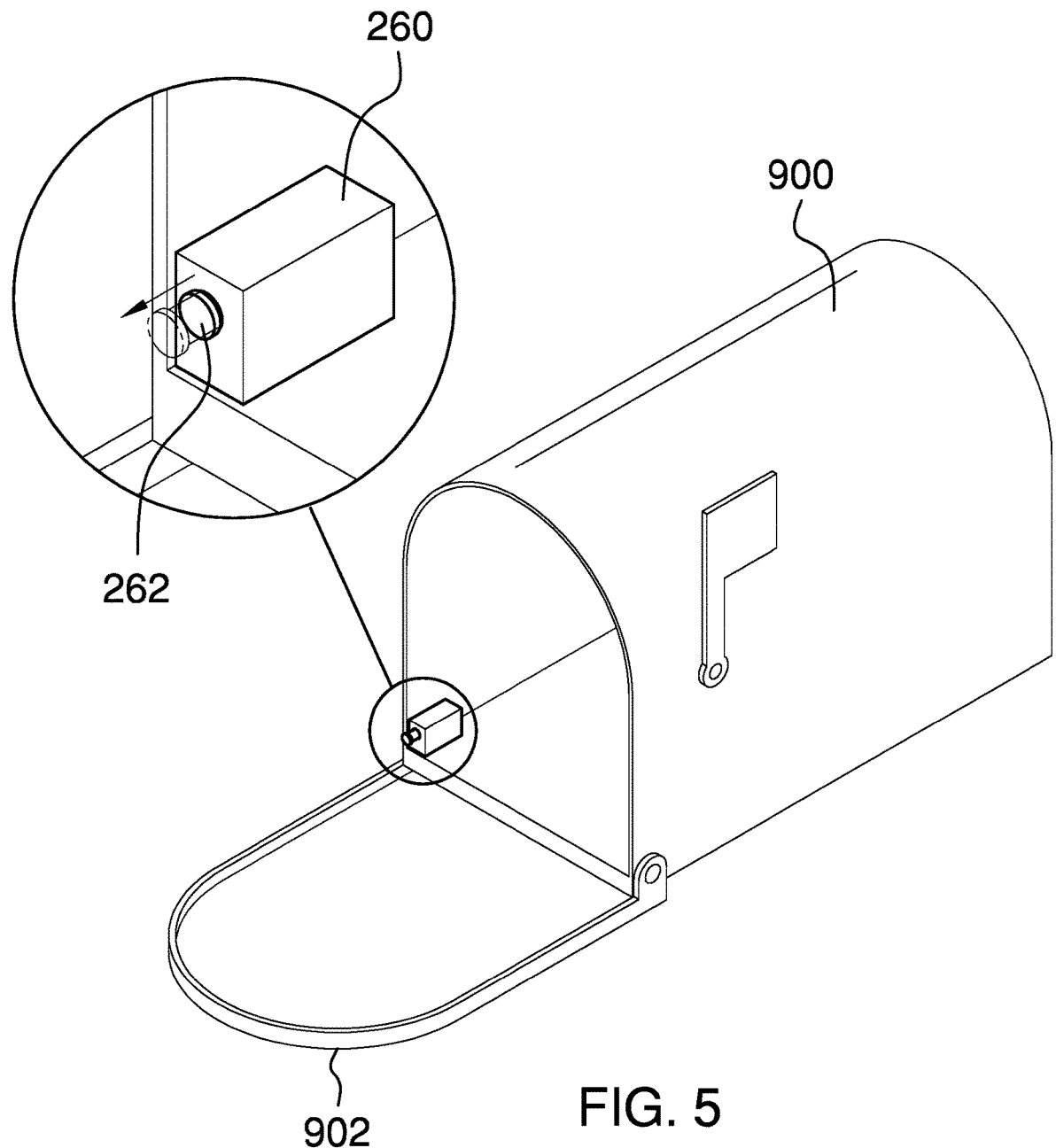
FIG. 5 is a detail view of an embodiment of the disclosure.
Figure 6:
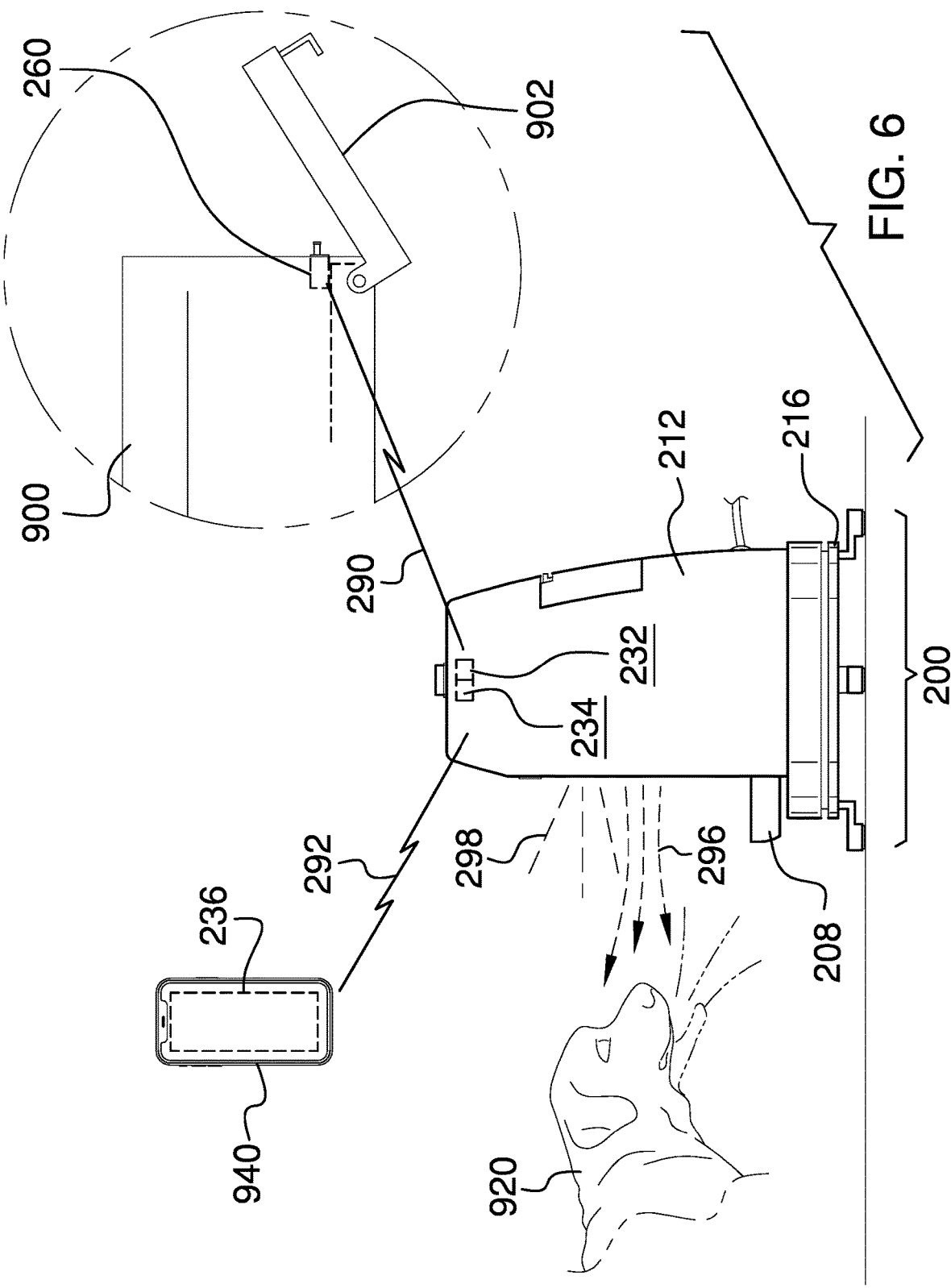
FIG. 6 is an in-use view of an embodiment of the disclosure.

Detailed reference will now be made to a first potential embodiment of the disclosure, which is illustrated in FIGS. 1 through 6.

The remote pet treat-dispensing system for use with a mailbox 100 (hereinafter invention) comprises a treat dispensing unit 200 and a remote activation unit 260. The invention 100 may be adapted to train a dog 920 to behave less aggressively when a mail carrier delivers mail. Responsive to an indication from the remote activation unit 260 that the mail carrier has accessed a mail receptacle 900, the treat dispensing unit 200 may be adapted to play an audible sound 298 intended to attract the dog 920 to the treat dispensing unit 200, may activate an air moving device 240 to diffuse the scent of a plurality of dog treats 930 stored within the treat dispensing unit 200, and may dispense one or more individual dog treats 932. As non-limiting examples, the mail receptacle 900 may be a mailbox located outside of a building or a mail slot located on a front door.

The treat dispensing unit 200 may comprise an enclosure 210, a treat dispensing mechanism, a control circuit 230, a camera 244, a sound transducer 248, the air moving device 240, and a rotation motor 250. The treat dispensing unit 200 may be adapted to be positioned inside of the building where the treat dispensing unit 200 is accessible by the dog 920.

The enclosure 210 may comprise a top housing 212 and a base 216. The top housing 212 may house the treat dispensing mechanism, the control circuit 230, the air moving device 240, the camera 244, and the sound transducer 248. The base 216 may elevate the top housing 212 above a floor on a plurality of feet that may stabilize the invention 100. The top housing 212 may be pivotably coupled to the base 216 such that an azimuth angle 294 of the top housing 212 may be varied.

The treat dispensing mechanism may comprise a treat hopper 222, a dispensing chute 226, a treat release mechanism 228, and a tray 208. Upon activation by the control circuit 230, the treat release mechanism 228 may dispense the one or more individual dog treats 932 from the treat hopper 222 into the tray 208. The one or more individual dog treats 932 may travel from the treat hopper 222 to the tray 208 via the dispensing chute 226. The tray 208 may be accessible outside of the top housing 212 on the lower front of the top housing 212. The tray may be adapted to hold the one or more individual dog treats 932 until the one or more individual dog treats 932 are retrieved by the dog 920. The treat hopper 222 may be located within the top housing 212. A refill door 224 on the top housing 212 may be opened in order to place the plurality of dog treats into the treat hopper 222.

The treat release mechanism 228 may block the dispensing chute 226 such unless activated by the control circuit 230. Upon activation, the treat release mechanism 228 may move to permit the one or more individual dog treats 932 to enter the dispensing chute 226 and travel to the tray 208.

As non-limiting examples, the treat release mechanism 228 may be a rotating door, a pivoting vane, a flap, or a shutter that may be activated by an electrical signal from the control circuit 230.

The control circuit 230 may be an electrical circuit that monitors and controls the operation of the treat dispensing unit 200. In some embodiments, the control circuit 230 may be microprocessor-based. As non-limiting examples, the control circuit 230 may monitor and control the treat release mechanism 228, an activation receiver 232, a communication transceiver 234, the air moving device 240, the sound transducer 248, and the rotation motor 250

The activation receiver 232 may receive a first wireless signal 290 from the remote activation unit 260 indicating that a mail receptacle door 902 of the mail receptacle 900 has been moved, signifying the presence of the mail carrier. Upon receiving the first wireless signal 290 via the activation receiver 232, the control circuit 230 may initiate a response that comprises activating the camera 244, activating the sound transducer 248, activating the air moving device 240 and the rotation motor 250, activating the treat release mechanism 228, or any combination thereof.

The control circuit 230 may be adapted to activate the camera 244 in order to record a video showing the response of the dog 920. The camera 244 may start recording upon receipt of the first wireless signal 290 and may record for a first pre-defined time interval after activation. The camera 244 may be adapted for a user to review the recorded video on an application program 236 executing on a smart phone 940. The recorded video may be accessed by the application program 236 via a second wireless signal 292 sent between the communication transceiver 234 and the smart phone 940.

As non-limiting examples, the first wireless signal 290 and the second wireless signal 292 may be Bluetooth, Wi-Fi, NearLink, NFC, LPWAN, ultra-wideband (UWB), IEEE 802.15.4, or any combination thereof.

The sound transducer 248 may be configured to play the audible sound 298 passed to the sound transducer 248 as an electrical audio signal sourced from the control circuit 230. As non-limiting examples, the sound transducer 248 may be a speaker and the audible sound 298 may be a recording of the dog owner's voice.

The air moving device 240 may be activated to blow a stream of air 296 over the treat hopper 222 and out of the top housing 212 via a front vent aperture 214. The air moving device 240 may thereby be adapted to emit the scent of the plurality of dog treats 930 from the top housing 212 in order to attract the dog 920. The air moving device 240 may be energized upon receipt of the first wireless signal 290 and may continue to move the stream of air 296 for a second pre-defined time interval after activation. As a non-limiting example, the air moving device 240 may be a fan.

The control circuit 230 may activate the rotation motor 250 to operate simultaneously with the air moving device 240. The rotation motor 250 may be operable to pivot the top housing 212 in an oscillatory manner such that the top housing 212 may pivot back and forth to change the azimuth angle 294 of the front vent aperture 214. The oscillatory motion may increase the spatial volume within the building that is exposed to the scent of the plurality of dog treats 930. In a preferred embodiment, the top housing 212 may oscillate back and forth through an angle of approximately 60 degrees.

A power source for the treat dispensing unit 200 may be an AC cord 256.

The remote activation unit 260 may comprise an activation control 262, a transmitter 264, and an activation unit battery 266. The remote activation unit 260 may be coupled to the mail receptacle 900 where the activation control 262 may sense movement of the mail receptacle door 902. Responsive to movement of the mail receptacle door 902, the remote activation unit 260 may send the first wireless signal 290 to the activation receiver 232 via the transmitter 264.

As non-limiting examples, the activation control 262 may be an electromechanical switch comprising electromechanical contacts, a magnetic switch that may sense a change in a magnetic field, an optical switch that may detect an interruption of an optical path, or any combination thereof.

The transmitter 264 may be powered by the activation unit battery 266.

In use, the remote activation unit 260 may be coupled to a mail receptacle 900 such that the remote activation unit 260 may detect movement of the mail receptacle door 902. The treat dispensing unit 200 may be placed within the building at a location that is accessible to the dog 920. The treat hopper 222 may be filled with a plurality of dog treats 930. Responsive to the mail carrier opening the mail receptacle door 902, the remote activation unit 260 may transmit the first wireless signal 290 to the activation receiver 232 in the treat dispensing unit 200.

Upon receiving the first wireless signal 290 via the activation receiver 232, the control circuit 230 may initiate a response comprising any or all of the following actions, not necessarily in the order shown:

The control circuit 230 may activate the camera 244 to record the actions of the dog 920.

The control circuit 230 may activate the sound transducer 248 to play an audible sound 298 intended to attract the dog 920 to the treat dispensing unit 200. As a non-limiting example, the audible sound 298 may be the dog owner's recorded voice.

The control circuit 230 may activate the air moving device 240 to create the stream of air 296 through the treat hopper 222 such that the scent of the plurality of dog treats 930 permeates the space in front of the top housing 212.

The control circuit 230 may activate the rotation motor 250 to cause an oscillatory motion of the top housing 212 in order to direct the scent of the plurality of dog treats 930 into a larger space.

The control circuit 230 may activate the treat release mechanism 228 to dispense one or more individual dog treats 932 into the tray 208

The control circuit 230 may de-activate the camera 244, the sound transducer 248, the air moving device 240, and the rotation motor 250 after one or more predetermined time intervals.

The user may review recorded video of the dog 920 and may change the audible sound 298 that plays through the sound transducer 248 via an application program 236 on a smart phone 940.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, "AC" may be an acronym for alternating current.

As used in this disclosure, an "aperture" may be an opening in a surface or object. Aperture may be synonymous with hole, slit, crack, gap, slot, or opening.

As used in this disclosure, an "application" or "app" may be software that is designed to perform one or more specific tasks on a personal computing device, smart phone, or some other computing device.

As used herein, "approximate" and "approximately" indicate that information that is being presented is not critical for proper functioning of the invention and that the information is being provided only to assist in a better understanding of some physical characteristic of an embodiment of the invention. As a non-limiting example, a device that is described as "cubical and approximately 1 inch long on each side" is not required to be precisely 1 inch long on each side and the reader may understand that the device will likely fit in their pocket.

As used in this disclosure, the "azimuth" or azimuth angle, refers to an angle that is measured in a plane that is perpendicular to the either the vertical direction or the force of gravity.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "camera" may be a sensor that converts light into electric signals that encode the spatial orientation of the captured light in a manner that reproduces the images seen by a human eye.

As used herein, a "chute" may be a sloping and/or curving channel or slide for conveying things to a lower level.

As used herein, the words "couple", "couples", "coupled" or "coupling", may refer to connecting, either directly or indirectly, and does not necessarily imply a mechanical connection.

As used in this disclosure, a "fan" may be an electromechanical device with rotating blades that is used to create a flow or current of air.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "housing" may be a rigid or semi-rigid casing that encloses and protects one or more devices.

As used in this disclosure, a "motor" may refer to a device that transforms energy from an external power source into mechanical energy.

As used herein, "oscillatory" or "vibratory" may refer to a rhythmic or repetitious motion.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used herein, the terms "processor", "central processor", "central processing unit", "CPU", or "microprocessor" may refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used herein, "smart phone" or "smartphone" may refer to a personal communication device that incorporates cellular phone calling and texting capabilities along with advanced features. Non-limiting examples of the advanced features of a smart phone may include camera functions, multimedia functions (such as music and video recording and playback and gaming), internet functions (such as web browsing and file uploading/downloading), and Global Positioning System capabilities. A smartphone may be able to execute downloaded application programs that expand the capabilities of the smartphone.

As used in this disclosure, a "speaker" may be an electrical transducer that converts an electrical signal into an audible sound, A speaker may also be referred to as a loudspeaker.

As used in this disclosure, a "transceiver" may be a device that is used to transmit and/or receive signals. The signals may be audible, optical, or RF in nature.

As used in this disclosure, a "transducer" may be a device that converts a physical quantity, such as pressure or brightness, into an electrical signal or a device that converts an electrical signal into a physical quantity.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A remote pet treat-dispensing system for use with a mailbox comprising:
   a treat dispensing unit and a remote activation unit;
   wherein the remote pet treat-dispensing system for use with a mailbox is adapted to train a dog to behave less aggressively when a mail carrier delivers mail;
   wherein responsive to an indication from the remote activation unit that the mail carrier has accessed a mail receptacle, the treat dispensing unit is adapted to play an audible sound intended to attract the dog to the treat dispensing unit, activate an air moving device to diffuse the scent of a plurality of dog treats stored within the treat dispensing unit, and dispense one or more individual dog treats;
   wherein the treat dispensing unit comprises an enclosure, a treat dispensing mechanism, a control circuit, a camera, a sound transducer, the air moving device, and a rotation motor;
   wherein the treat dispensing unit is adapted to be positioned inside of a building where the treat dispensing unit is accessible by the dog;
   wherein the enclosure comprises a top housing and a base;
   wherein the top housing houses the treat dispensing mechanism, the control circuit, the air moving device, the camera, and the sound transducer;
   wherein the base elevates the top housing above a floor on a plurality of feet that stabilize the remote pet treat-dispensing system for use with a mailbox;
   wherein the top housing is pivotably coupled to the base such that an azimuth angle of the top housing is variable.

2. The remote pet treat-dispensing system for use with a mailbox according to claim 1
   wherein the treat dispensing mechanism comprises a treat hopper, a dispensing chute, a treat release mechanism, and a tray;
   wherein upon activation by the control circuit, the treat release mechanism dispenses the one or more individual dog treats from the treat hopper into the tray;
   wherein the one or more individual dog treats travel from the treat hopper to the tray via the dispensing chute.

3. The remote pet treat-dispensing system for use with a mailbox according to claim 2
   wherein the tray is accessible outside of the top housing on the lower front of the top housing;
   wherein the tray is adapted to hold the one or more individual dog treats until the one or more individual dog treats are retrieved by the dog.

4. The remote pet treat-dispensing system for use with a mailbox according to claim 3
   wherein the treat hopper is located within the top housing;
   wherein a refill door on the top housing is opened in order to place the plurality of dog treats into the treat hopper.

5. The remote pet treat-dispensing system for use with a mailbox according to claim 4
   wherein the treat release mechanism blocks the dispensing chute such unless activated by the control circuit;
   wherein upon activation, the treat release mechanism moves to permit the one or more individual dog treats to enter the dispensing chute and travel to the tray.

6. The remote pet treat-dispensing system for use with a mailbox according to claim 5
   wherein the treat release mechanism is a rotating door, a pivoting vane, a flap, or a shutter that is activated by an electrical signal from the control circuit.

7. The remote pet treat-dispensing system for use with a mailbox according to claim 5
   wherein the control circuit is an electrical circuit that monitors and controls the operation of the treat dispensing unit.

8. The remote pet treat-dispensing system for use with a mailbox according to claim 7
   wherein the control circuit monitors and controls the treat release mechanism, an activation receiver, a communication transceiver, the air moving device, the sound transducer, and the rotation motor.

9. The remote pet treat-dispensing system for use with a mailbox according to claim 8
   wherein the activation receiver receives a first wireless signal from the remote activation unit indicating that a mail receptacle door of the mail receptacle has been moved;
   wherein upon receiving the first wireless signal via the activation receiver, the control circuit initiates a response that comprises activating the camera, activating the sound transducer, activating the air moving device, activating the rotation motor, activating the treat release mechanism, or any combination thereof.

10. The remote pet treat-dispensing system for use with a mailbox according to claim 9
    wherein the control circuit is adapted to activate the camera in order to record a video showing the response of the dog;
    wherein the camera starts recording upon receipt of the first wireless signal and records for a first pre-defined time interval after activation;
    wherein the camera is adapted for a user to review the recorded video on an application program executing on a smart phone;

wherein the recorded video is accessed by the application program via a second wireless signal sent between the communication transceiver and the smart phone.

11. The remote pet treat-dispensing system for use with a mailbox according to claim 10
wherein the sound transducer is configured to play the audible sound passed to the sound transducer as an electrical audio signal sourced from the control circuit.

12. The remote pet treat-dispensing system for use with a mailbox according to claim 11
wherein the sound transducer is a speaker and the audible sound is a recording of the dog owner's voice.

13. The remote pet treat-dispensing system for use with a mailbox according to claim 11
wherein the air moving device is activated to blow a stream of air over the treat hopper and out of the top housing via a front vent aperture;
wherein the air moving device is adapted to emit the scent of the plurality of dog treats from the top housing in order to attract the dog;
wherein the air moving device is energized upon receipt of the first wireless signal and continues to move the stream of air for a second pre-defined time interval after activation.

14. The remote pet treat-dispensing system for use with a mailbox according to claim 13
wherein the air moving device is a fan.

15. The remote pet treat-dispensing system for use with a mailbox according to claim 13
wherein the control circuit activates the rotation motor to operate simultaneously with the air moving device;
wherein the rotation motor is operable to pivot the top housing in an oscillatory manner such that the top housing pivots back and forth to change the azimuth angle of the front vent aperture;
wherein the oscillatory motion increases the spatial volume within the building that is exposed to the scent of the plurality of dog treats.

16. The remote pet treat-dispensing system for use with a mailbox according to claim 13
wherein the remote activation unit comprises an activation control, a transmitter, and an activation unit battery;
wherein the remote activation unit is coupled to the mail receptacle where the activation control senses movement of the mail receptacle door;
wherein responsive to movement of the mail receptacle door, the remote activation unit sends the first wireless signal to the activation receiver via the transmitter.

17. The remote pet treat-dispensing system for use with a mailbox according to claim 16
wherein the activation control is an electromechanical switch comprising electromechanical contacts, a magnetic switch that senses a change in a magnetic field, an optical switch that detects an interruption of an optical path, or any combination thereof.

18. The remote pet treat-dispensing system for use with a mailbox according to claim 16
wherein the transmitter is powered by the activation unit battery.

* * * * *